US008096879B2

(12) United States Patent
Takeda

(10) Patent No.: US 8,096,879 B2
(45) Date of Patent: Jan. 17, 2012

(54) BLOCK GAME PROGRAM AND BLOCK GAME APPARATUS FOR REMOVING BLOCKS IN ACCORDANCE WITH A TIMING OPERATION

(75) Inventor: Kento Takeda, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 474 days.

(21) Appl. No.: 12/360,303

(22) Filed: Jan. 27, 2009

(65) Prior Publication Data

US 2009/0197677 A1   Aug. 6, 2009

(30) Foreign Application Priority Data

Jan. 31, 2008   (JP) ................. 2008-020696

(51) Int. Cl.
*A63F 13/00*   (2006.01)
(52) U.S. Cl. ........................................................ 463/31
(58) Field of Classification Search .................... 463/30, 463/31

See application file for complete search history.

(56) References Cited

U.S. PATENT DOCUMENTS

| | | | | |
|---|---|---|---|---|
| 6,347,995 | B1 * | 2/2002 | Igarashi et al. ................. | 463/15 |
| 2002/0098890 | A1 | 7/2002 | Sakaguchi | |
| 2003/0013508 | A1 | 1/2003 | Sato | |
| 2003/0098864 | A1 | 5/2003 | Ohno | |
| 2007/0184886 | A1 * | 8/2007 | Floden ............................ | 463/14 |
| 2008/0300060 | A1 | 12/2008 | Tomita | |
| 2010/0069133 | A1 * | 3/2010 | Takeda .............................. | 463/9 |

FOREIGN PATENT DOCUMENTS

JP   2002-946   1/2002

OTHER PUBLICATIONS

How to play Collapse Online (http://web.archive.org/web/20101222010546/http://www.ehow.com) Jan. 24, 2008.*
Declaration regarding MSN Collapse Jul. 6, 2011.*
PlayStation Complete Guidebook Series 41, Puyo-Puyo Final Winning Strategy, Futabasha Publishers, Inc., Sep. 30, 1997, New Edition, pp. 6-9 and 18-19.
Pochitto-Nya, Famitsu Xbox, Enterbrain Inc., Dec. 1, 2002, vol. 1, No. 8 (8), p. 140.
Tetris the Grand Master 3 Terror Instinct, Monthly Acradia, Enterbrain Inc., Jun. 1, 2005, vol. 6, No. 6 (61), pp. 96-97.
Lumines Live!, Famitsu Xbox360, Enterbrain Inc., Jun. 1, 2007, vol. 6, No. 6 (62), p. 87.
Action Puzzle "Rotating Yam Cha" in i-mode "Get! Petit Apri", [online], Impress Watch Corporatin, an Impress Group company, posted on May 14, 2007, [Search Date: Nov. 17, 2009], Internet (URL: http://k-tai.impress.co.jp/cda/article/news_toppage/34447.html).
Namara-Link Fee Game "Rotating Yam Cha", [online], Ninjablog, Apr. 21, 2007, [Search Date: Nov. 17, 2009], Internet (URL: http://mybkm.blog.shinobi.jp/Entry/148/).
English language Abstract of JP 2002-946, Jan. 8, 2002.

* cited by examiner

*Primary Examiner* — Thomas L Dickey
(74) *Attorney, Agent, or Firm* — Greenblum & Bernstein, P.L.C.

(57) ABSTRACT

A block game program and a block game apparatus that can improve interest therein by using a new block removal method and a new block movement method are achieved. The game program sequentially produces blocks in a playing field displayed on a display screen to form a block group. The game program causes the game apparatus to function as a mouse that receives an operation, and a block removal control unit that removes blocks satisfying a removal condition from among the block group in accordance with timing at which the mouse receives an operation.

20 Claims, 12 Drawing Sheets

BLOCK GAME PROGRAM AND BLOCK GAME APPARATUS FOR REMOVING BLOCKS IN ACCORDANCE WITH A TIMING OPERATION

CROSS REFERENCE TO RELATED APPLICATION

The present disclosure relates to subject matter contained in Japanese Patent Application No. 2008-020696, filed on Jan. 31, 2008, the disclosure of which is expressly incorporated herein by reference in its entirety.

BACKGROUND OF THE INVENTION

1. Field of the Invention

The present invention relates to a block game program for playing a game with blocks displayed on a display screen, and a block game apparatus.

2. Description of the Related Art

Block games are known in which several kinds of blocks are displayed in a playing field on a display screen, and a player moves specific blocks or arranges the blocks in the playing field (for example, refer to Japanese Unexamined Patent Publication No. 2002-946). In such block games, the blocks are moved in accordance with operations by a player, and blocks satisfying a removal condition are removed.

In conventional block games, however, a block removal method or a block movement method in the playing field is overly simple.

SUMMARY OF THE INVENTION

An object of the invention is to provide a block game program and a block game apparatus that use a new block removal method or a new block movement method, thereby improving interest.

To achieve the above-described object, the invention has the following aspects. For ease of understanding, reference numerals described in the embodiments of the invention reference the constituent elements, but this is not intended to limit the invention. The referenced constituent elements may be appropriately improved or at least some of them may be substituted with different constituent elements.

According to a first aspect of the invention, in a block game program for a game, blocks (B) sequentially appear in a playing field (41) displayed on a display screen (40a) to form a block group (B0), and the blocks satisfying a removal condition from among the block group (B0) are removed, in which the program causes a computer (1) to function as an operating unit (2) that receives an operation, and a block removal controller (23) that removes the blocks satisfying the removal condition from among the block group in accordance with timing at which the operating unit receives the operation.

The program may cause the block removal controller (23) to switch a time period until a subsequent reception of the operating unit is permitted in accordance with a number of blocks (B) removed by the block removal controller.

The program may further cause the computer (1) to function as a block appearance controller (21) that switches a time period until a subsequent block appears in accordance with the number of blocks (B) removed by the block removal controller.

The program may further cause the computer (1) to function as a display controller (25) that displays a bar (43) moving across the playing field (41) when removing the blocks (B) satisfying the removal condition.

The program may cause the operating unit (2) to select at least one block (B) from among the block group (B0). The program may further cause the computer (1) to function as a block movement controller (22) that moves the blocks being selected by the operating unit and not satisfying the removal condition and that does not move the blocks being selected by the operating unit and satisfying the removal condition in accordance with an output from the operating unit.

The program may further cause the computer (1) to function as a display controller (25) that combines the blocks (B) satisfying the removal condition together and displays the combined blocks (B) on the display screen (40a) as a single fixed block (S).

The program may further cause the computer (1) to function as a display controller (25) that displays a number of blocks (B) satisfying the removal condition on the display screen (40a).

The program may cause the operating unit (2) to select at least one block (B) from among the block group (B0). The program may further cause the computer (1) to function as a block movement controller (22) that performs block movement processing to move the block selected by the operating unit in a predetermined direction from the block group and to then move the block toward the block group, and in a case where the block is selected again before coming into contact with the block group, performs the block movement processing for the block again.

The program may cause the operating unit (2) to select a rectangular area in the playing field (41). The program may cause the block movement controller (22) to select the blocks (B) in the rectangular area in accordance with an output from the operating device, and to rotate the selected blocks inside the rectangular area.

In the program, the blocks (B) may each have an attribute. The program may further cause the computer (1) to function as a display controller (25) that changes the display screen (40a) in accordance with the attribute of the removed blocks.

According to a second aspect of the invention, in a block game program for a game, blocks (B) sequentially appear in a playing field (41) displayed on a display screen (40a) to form a block group (B0), and the blocks satisfying a removal condition from among the block group (B0) are removed, in which the program causes a computer (1) to function as an operating unit (2) that selects at least one block from among the block group, and a block movement controller (22) that moves the blocks being selected by the operating unit and not satisfying the removal condition and does not move the blocks being selected by the operating unit and satisfying the removal condition in accordance with an output from the operating unit.

According to a third aspect of the invention, in a block game program for a game, blocks (B) sequentially appear in a playing field (41) displayed on a display screen (40a) to form a block group (B0), and the blocks satisfying a removal condition from among the block group (B0) are removed, in which the program causes a computer (1) to function as an operating unit (2) that selects at least one block from among the block group and a block movement controller (22) that performs block movement processing to move the block selected by the operating unit in a predetermined direction from the block group and to then move the block toward the block group, and in a case where the block is selected again before coming into contact with the block group, performs the block movement processing of the block again.

According to a forth aspect of the invention, a block game apparatus includes a storage unit (10) that stores the block game program according to any one of the first to third aspects of the invention, and a controller (20) that executes the block game program stored in the storage.

According to the aspects of the invention, the following advantages can be obtained.

(1) Since blocks are removed at times of outputs from the operating unit, the present invention can remove the blocks by a new removal method that enables a player to decide when to remove the blocks. In addition, the blocks satisfying the removal condition are deleted at one time, and thus the player can feel exhilaration.

(2) A time period until the blocks are selected by a subsequent operation varies in accordance with the number of removed blocks. Therefore, the player is prompted to arrange a larger number of blocks satisfying the removal condition so as to shorten a time period until the subsequent operation for removing the blocks is permitted, thereby advancing the game more advantageously.

(3) A time period until a block next appears is switched in accordance with the number of blocks removed. Therefore, the player is prompted to arrange a larger number of blocks satisfying the removal condition in order to extend the time period until the subsequent operation for removing the blocks is permitted.

(4) A bar spanning across the playing field is displayed when removing the blocks satisfying the removal condition. Therefore, timing at which blocks are actually removed is actually viewed on the display.

(5) In a case where one of the blocks satisfying the removal condition is selected, the block is controlled so as not to be moved. Therefore, once the removal condition is satisfied, there is no case where the removal condition becomes unsatisfied due to an erroneous operation. To the contrary, the blocks satisfying the removal condition may interfere with movement of another block. For this reason, a strategy regarding, for example, a sequence in which the blocks satisfying the removal condition are arranged, can be demanded from a player.

(6) Since the blocks satisfying the removal condition are displayed as a single fixed block, the blocks satisfying the removal condition are visibly displayed.

(7) The number of blocks satisfying the removal condition is displayed. Therefore, the player is able to recognize the number of blocks that can be actually removed.

(8) When a selected block is moved in a predetermined direction from the block group and then the block is selected again, the block is further moved in a predetermined direction. Therefore, it is possible to provide a new game in which a block is moved away from the block group.

(9) The selected blocks are rotated within a rectangular area. Therefore, the blocks are moved in an interesting manner.

(10) The display screen images are changed in accordance with the attributes of the removed blocks. Therefore, the player may select a block to be removed so that the display screen should be changed to a display screen of the player's choice.

DETAILED DESCRIPTION OF PREFERRED EMBODIMENT

The invention provides a block game program and a block game apparatus that can improve interest therein by using a new block removal method and a new block movement method. To achieve this purpose, a game apparatus is configured to function as a mouse, which receives an operation, and a block removal controller, which removes blocks satisfying a removal condition from among a block group in accordance with timing at which the mouse receives an operation.

First Embodiment

Figure 1:
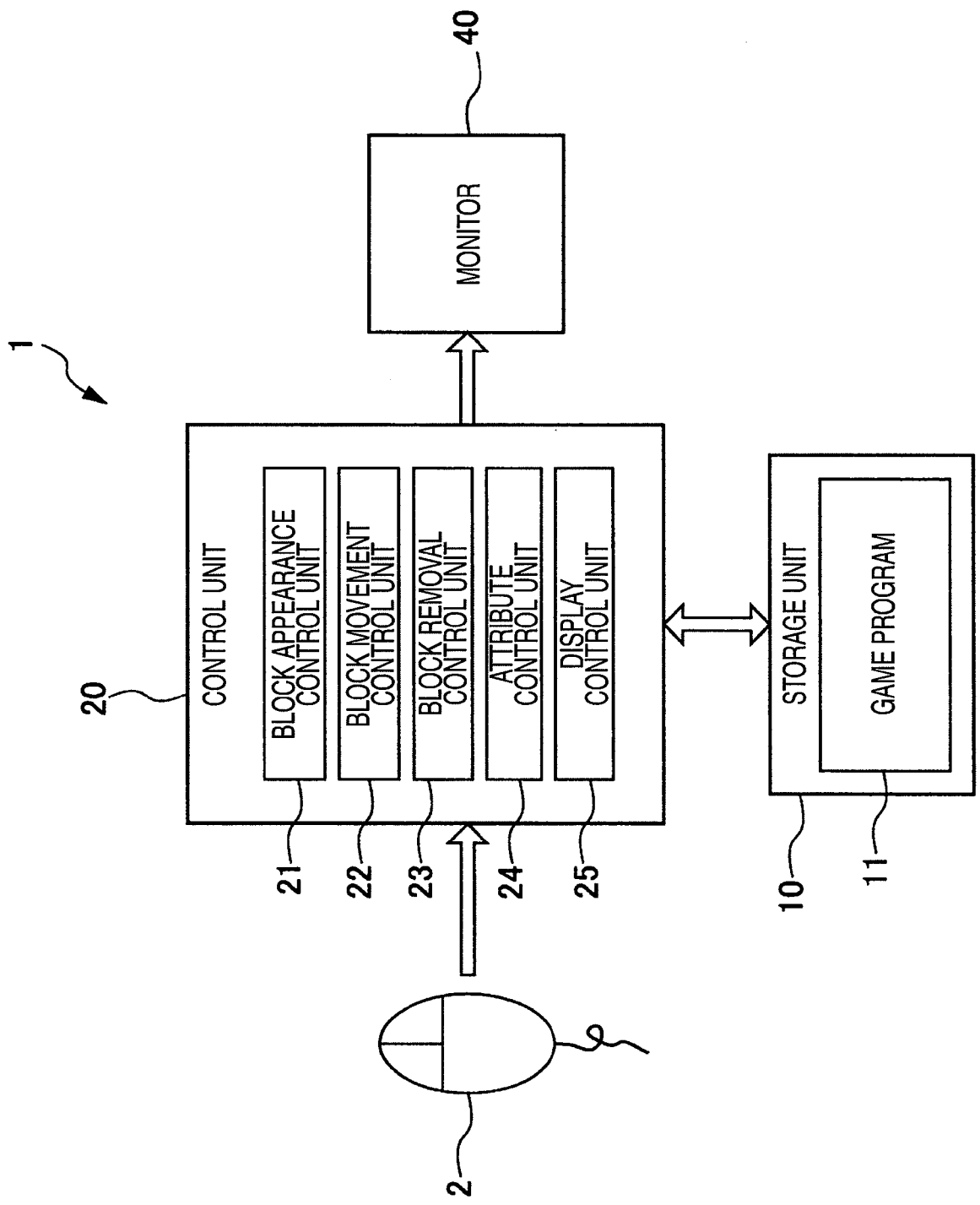
FIG. 1 is a block diagram of a game apparatus according to a first embodiment of the invention.

A first embodiment of the invention will now be described with reference to the drawings. FIG. 1 is a block diagram of a game apparatus 1 according to a first embodiment of the invention.

Figure 2:
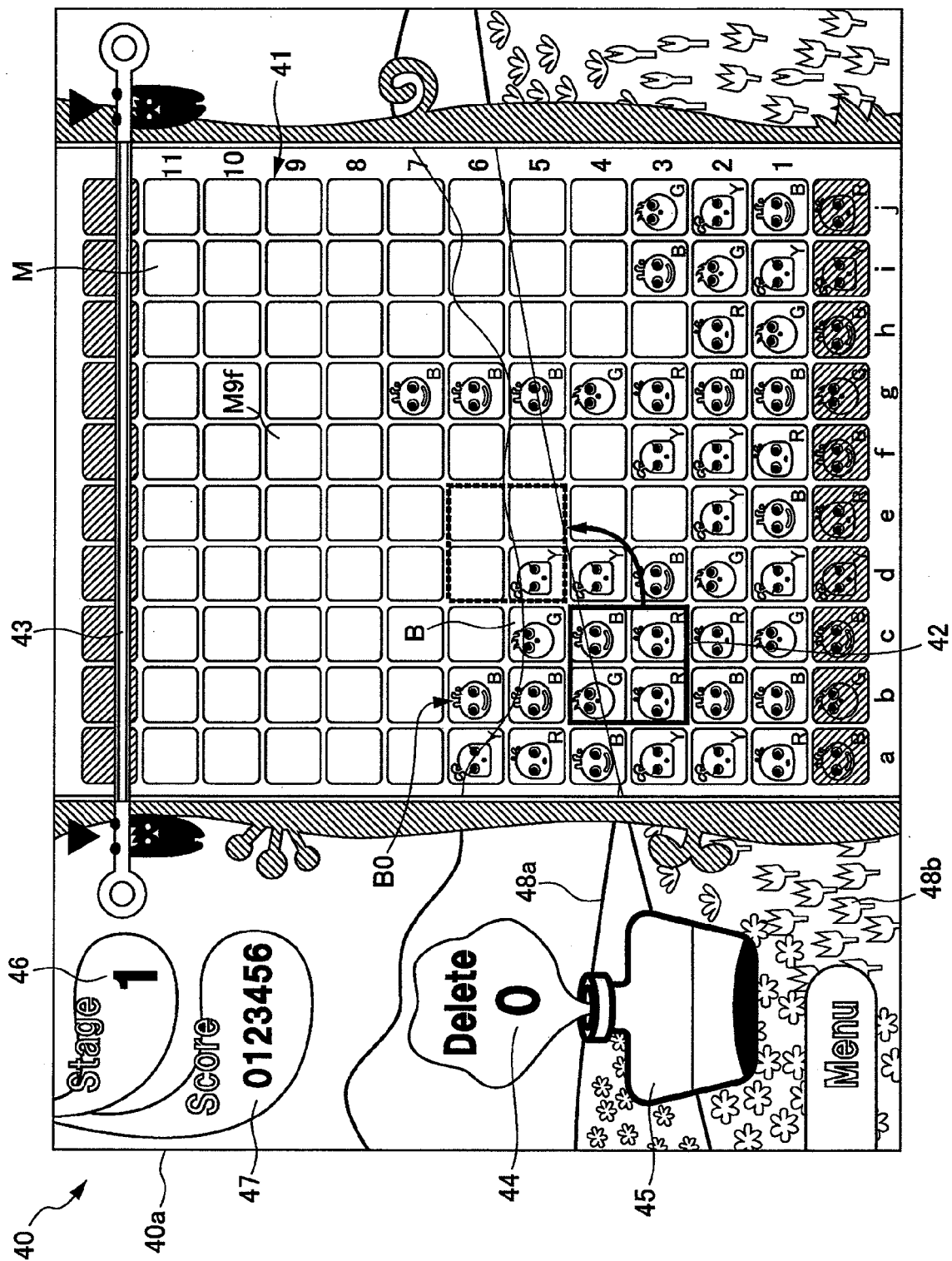
FIG. 2 is a diagram showing a display screen image on a monitor according to the first embodiment.

FIG. 2 is a diagram showing a display screen 40*a* of a monitor 40 of the first embodiment.

In the present embodiment, a description will be provided for an example where a game apparatus 1 is a personal computer that stores a game program. The term "computer" used herein indicates an information processing apparatus including a storage device, a control unit, and the like. As described below, the game apparatus 1 is an information processing apparatus including a storage unit 10 and a control unit 20, and falls within the concept of the term "computer" used herein. In addition, a game machine for commercial use, a game machine for home use, and a mobile phone fall within the concept of the term "computer" used herein.

As shown in FIG. 1, the game apparatus 1 includes a mouse 2, a storage unit 10, a control unit 20, and a monitor 40.

The mouse 2 is an input device that receives a player's operation.

The storage unit 10 is a storage device, for example, a semiconductor memory device, which stores a game program 11 of a block game for operating the game apparatus 1 and an arrangement of blocks B during play (see FIG. 2).

The game program 11 is a program that is executable by player software, for example, FLASH (Registered Trademark) PLAYER. The game program 11 may be downloaded from a server through a communication network (not shown), such as the Internet, or may be read from a storage medium, such as CD-ROM, by a reading device (not shown).

The control unit 20 performs overall control of the game apparatus 1, and is formed of, for example, a central processing unit (CPU) and the like. The control unit 20 reads out and executes various programs stored in the storage unit 10, and implements various functions of the invention, in cooperation with the above-described hardware. The control unit 20 includes a block appearance control unit 21, a block movement control unit 22, a block removal control unit 23, an attribute control unit 24, and a display control unit 25.

The block appearance control unit 21 performs processing to generate blocks B (see FIG. 2) in a playing field 41 (see FIG. 2).

The block movement control unit 22 performs processing to move the blocks B displayed in the playing field 41 in accordance with an output from the mouse 2.

The block removal control unit 23 performs processing to remove the blocks B during play.

The attribute control unit 24 manages the attributes of the blocks B. The attribute indicates the property of each block B. In this embodiment, the attribute is represented by four colors (red, blue, yellow, and green) of the blocks B and the size of each block. In order to increase the complexity of the play content, another attribute, such as the shape of each block B, may be further provided.

The display control unit 25 performs processing related to display on the monitor 40. The details of the processing in the respective control units will be described below.

The monitor 40 is a display device that displays a display screen 40a (see FIG. 2) of a game, and is, for example, a liquid crystal display (LCD).

As shown in FIG. 2, on the display screen 40a of the monitor 40, the playing field 41, a cursor 42, a removal bar 43, a number-of-removal-condition-blocks display portion 44, a bottle 45, a stage number display portion 46, a score display portion 47, and a background image 48 are displayed.

The playing field 41 is a main area where a game is actually advanced. The playing field is a rectangular area displayed substantially at the center of the display screen 40a of the monitor 40. The playing field 41 includes 110 squares M of 11 rows×10 columns. In the following description, the rows are assigned numbers 1 to 11 from the bottom to the top of the playing field 41, and the columns are assigned letters a to j from the left side to the right side of the playing field 41. Then, a specific square M is represented by a square M(row)(column). For example, a square M of the 9-th row and the 6-th column is represented by a square M9f.

In the playing field 41, the blocks B appear and are stacked from a lower side of the playing field 41, and are individually arranged in the squares M. The colors of the blocks B are represented by characters "R", "B", "Y", and "G" written in the squares M in the drawing. When specifying a specific block B in the following explanation, the specific block is indicated by a color and a numeral in parenthesis, such as a block B(R1).

The cursor 42 is a rectangular-shaped object for indicating an area in the playing field 41 selected by the player. The cursor 42 is moved by movement of the mouse 2 (see dotted line of FIG. 2), and selects four squares M in the rectangular area. When the mouse 2 is left clicked, blocks B in the squares M selected by the cursor 42 are selected.

The removal bar 43 displays timing at which blocks B are removed. The removal bar 43 moves across the playing field 41 from top to bottom, when the blocks B are actually removed as described later.

The number-of-removal-condition-blocks display portion 44 is an area where the number of blocks B satisfying the removal condition in the playing field 41 is displayed as a numeric value.

The bottle 45 represents the number of blocks B removed at a stage in which a game is being played, by the amount of a liquid therein.

The stage number display portion 46 is an area that displays the stage number in play. The score display portion 47 is an area that displays a score (points).

The background image 48 includes pleasing images, such as a meadow 48a and flowers 48b, such that interesting images are displayed on the display screen 40a. The background image 48 is transparently displayed in the playing field 41. Therefore, the playing field 41 looks to be disposed on the background image 48.

Next, processing in the control unit 20 will be described in connection with rules of the game. FIGS. 3 to 10 are diagrams showing the display screen 40a during play in the first embodiment.

Figure 3:
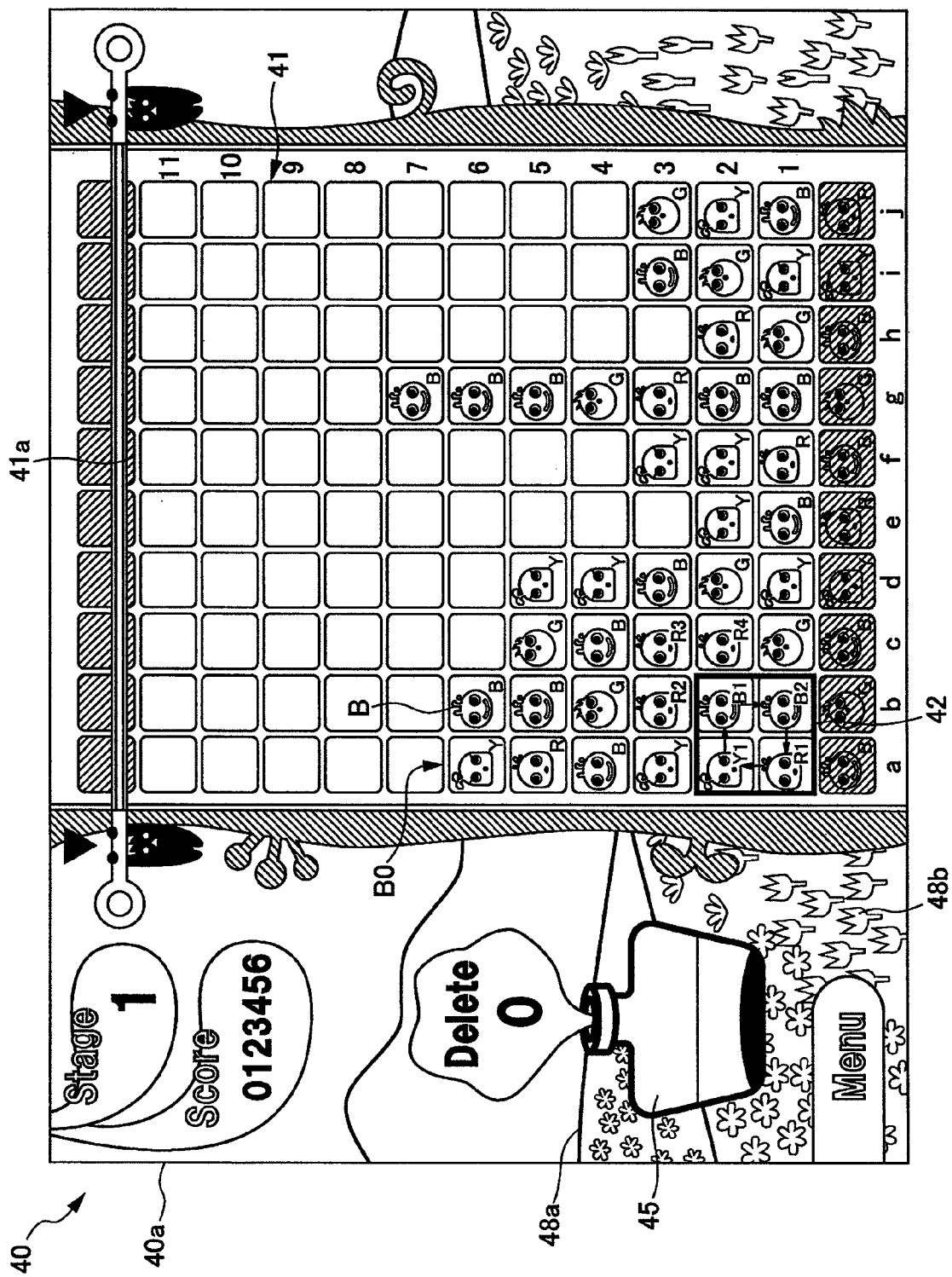
FIG. 3 is a diagram showing a display screen during play according to the first embodiment.

It should be noted that, to clearly show the playing field 41, the background image 48 in the playing field 41 is omitted in FIG. 3 and subsequent drawings.

As shown in FIG. 3, in this game, 10 blocks B in a horizontal line appear from the bottom every five seconds and are arranged in the squares M1a to M1j of the playing field 41. The next appearing blocks B are displayed in a shaded state on the lower side of the playing field 41.

If the blocks B appear from the bottom, the block appearance control unit 21 moves a group of the blocks B (hereinafter, referred to as a "block group B0") already arranged in the playing field 41 up by one row as if it rises upward. In this embodiment, the block group B0 indicates a group of the blocks B arranged on the upper side of the playing field 41 and being stacked unless the mouse 2 is operated or the blocks B are raised.

When a block B at the uppermost part of the block group B0 reaches a top portion 41a of the playing field 41, the control unit 20 ends the game (game over). To prevent the block B from reaching the top portion 41a, as described below, the player needs to move the blocks B in the playing field 41, successively arrange four or more blocks B in the vertical or horizontal directions to satisfy the removal condition, thereby removing the blocks B. If the blocks B disappear, the level of liquid in the bottle 45 is raised. If the bottle 45 is full with the liquid, a stage being played is completed.

[Block Movement Processing 1—Removal Condition Determination]

An explanation will be provided related to a case in which a block B(R1) in the square M1a is moved to the square M2b, whereby the removal condition of four blocks B(R1 to R4) in FIG. 3 is satisfied.

(1) If the player operates the mouse 2 to place the cursor 42 in an area including four squares M1a, M1b, M2a, and M2b, and clicks the left button of the mouse 2, the block movement control unit 22 determines, based upon the output from the mouse 2, that the blocks B(R1, Y1, B1, and B2) in the squares M1a, Mb1, M2a, and M2b are selected. The block movement control unit 22 moves (rotates) the blocks B(R1, Y1, B1, and B2) in a clockwise direction by one square inside the cursor 42. In this way, the game apparatus 1 rotates the blocks B inside the cursor 42 and moves the blocks B in an interesting manner.

The way to play the game may be varied by, for example, causing the block movement control unit to rotate the blocks B in a counterclockwise direction when the right button of the mouse 2 is clicked.

Figure 4:
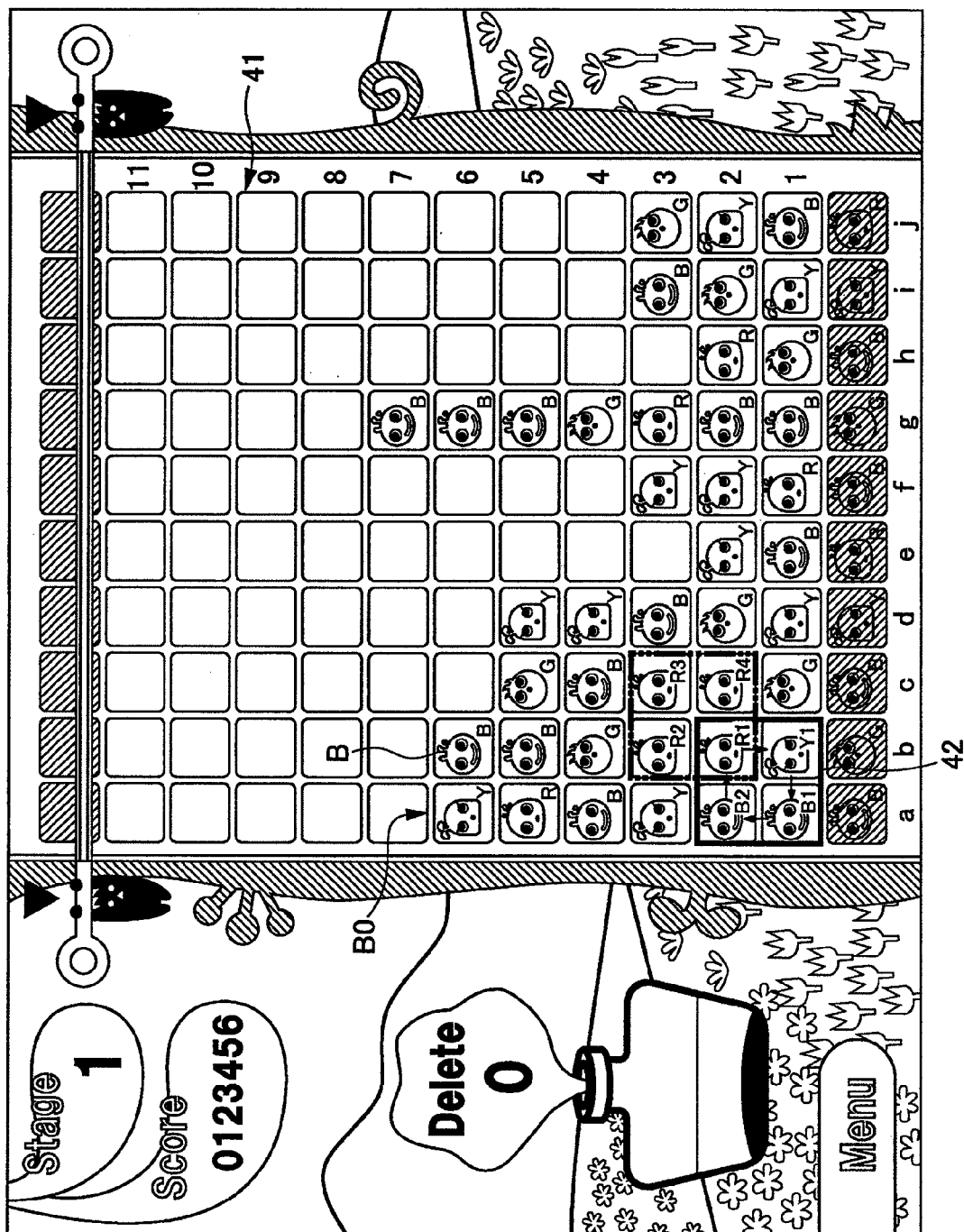
FIG. 4 is a diagram showing a display screen during play according to the first embodiment.

(2) If the cursor 42 remains unmoved, and the player left clicks the mouse 2 again, the block movement control unit 22 moves the blocks B(R1, Y1, B1, and B2) by one square again in the clockwise direction inside the cursor 42. Therefore, as shown in FIG. 4, the four blocks B of the same color (R1 to R4) (inside a two-dot-chain-line in the drawing) are successively arranged.

Figure 5:
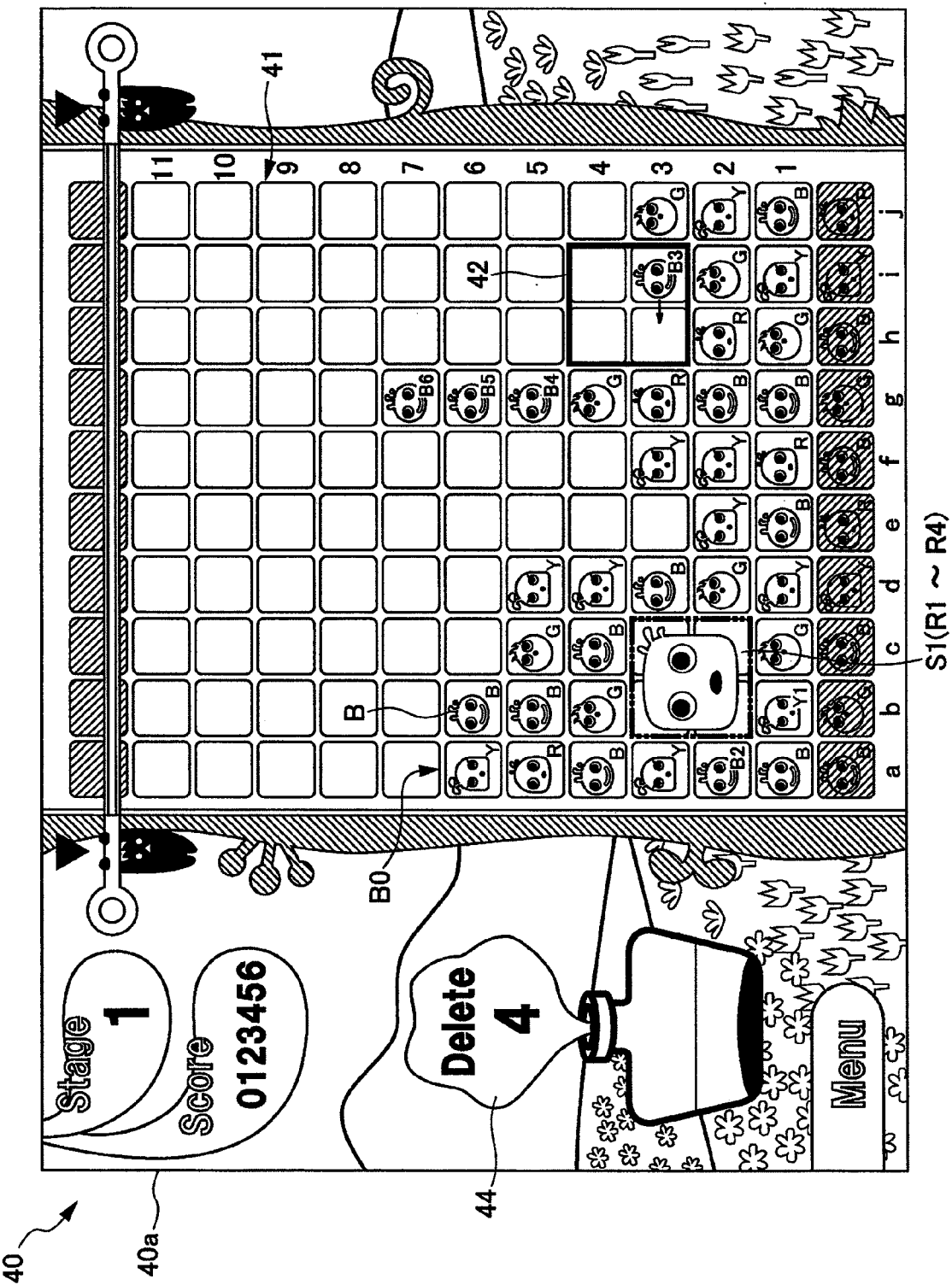
FIG. 5 is a diagram showing a display screen during play according to the first embodiment.

When the blocks B (R1 to R4) are not selected for about 0.3 seconds, for example, the attribute control unit 24 determines that the removal condition of the four blocks B (R1 to R4) is established, connects the four blocks B (R1 to R4) to each other, and sets a new attribute as a single fixed block S1(R1 to R4). As shown in FIG. 5, the display control unit 25 displays the blocks B(R1 to R4) in the playing field 41 as a single fixed block S1(R1 to R4).

The reason why approximately 0.3 seconds is given in order to generate the fixed block S1 is that the player is provided time for determining whether to further move the blocks B(R1 to R4).

As described above, the game apparatus 1 displays the blocks B satisfying the removal condition as the single fixed block S. Therefore, the game apparatus 1 is able to display the blocks B satisfying the removal condition so as to be easily recognizable. In this embodiment, characters of four small living things are combined with each other, and one large character is displayed, thereby achieving interesting display.

If the removal condition of the blocks B is achieved, the display control unit 25 displays the number of blocks B(R1 to R4) satisfying the removal condition, that is, the numeric value "4", in the number-of-removal-condition-blocks display portion 44, such that the player may recognize the number of blocks B to be removed.

When the fixed block S1(R1 to R4) is selected by the operation of the mouse 2, the block movement control unit 22 does not move the fixed block S1(R1 to R4) in the playing field 41. That is, in a case where blocks B not satisfying the removal condition are selected, the block movement control unit 22 moves the blocks B, while the blocks B are controlled so as not to be moved in a case where these selected blocks B satisfy the removal.

As such, once the removal condition is established and the fixed block S is generated, the game apparatus 1 does not move the fixed block S. Therefore, there is no case where the player clears the removal condition by an erroneous operation. On the other hand, the fixed block S stays in the squares M, and interferes with movement of other blocks B. Therefore, the player is required to play the game in a strategic manner considering the order in which the fixed block S should be generated.

During play of the game, the removal condition may be unconsciously established by the operation of the mouse 2, and the fixed block S may be generated. In such a case, the player may feel lucky since the blocks B can be removed, while he/she may feel unlucky since the fixed block S interferes with movement of other blocks B. Thus, the game apparatus 1, occasionally generates the fixed block S while the player does not intend to generated the fixed block S, and helps or interferes with the progress of play, thereby improving interest in the game.

[Block Movement Processing 2—Removal Condition Determination]

In the game of the present embodiment, it is possible to move a block B to a square M away from the block group B0 as described below.

Figure 6A:
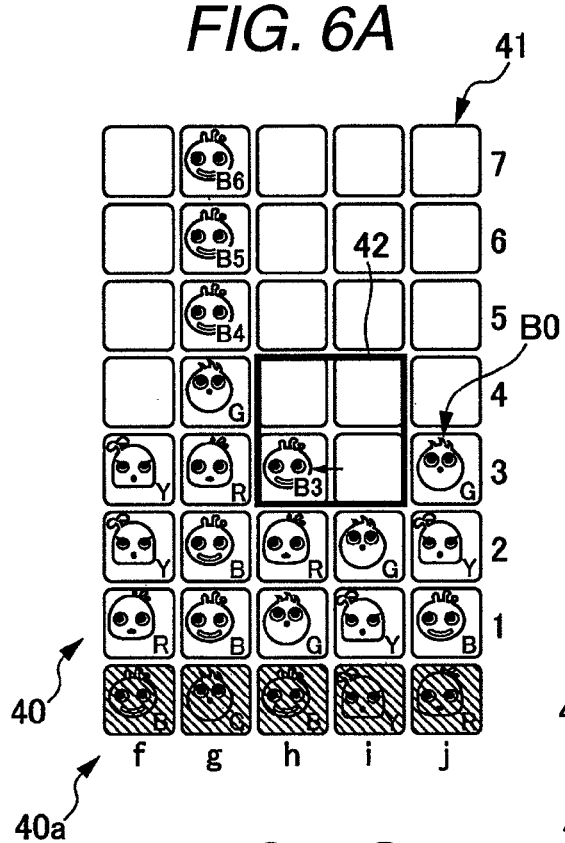
FIGS. 6A to 6D are diagrams respectively showing display screens during play according to the first embodiment.

(1) As shown in FIG. 5, when the player operates the mouse 2 to move the cursor 42 to an area of four squares M3h, M3i, M4h, and M4i, such that a block B (B3) is placed at a lower right side of the cursor 42, and clicks the left button of the mouse 2, the block movement control unit 22 determines, based upon the output from the mouse 2, that the block B (B3) in the square M3i is selected. Then, the block movement control unit 22 moves the block B (B3) in a clockwise direction inside the cursor 42 as shown in FIG. 6A. Thus, the block B (B3) is moved to the square M3h.

Figure 6B:
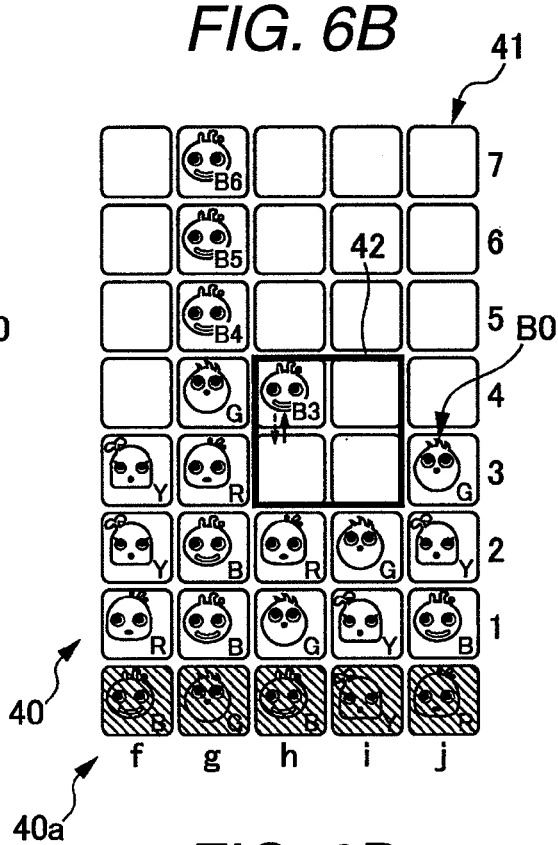

(2) If the left button of the mouse 2 is clicked again in a state where the cursor 42 is not moved, as shown in FIG. 6B, the block movement control unit 22 moves the block B (B3) again in the clockwise direction, that is, upward. Thus, the block B(B3) is moved to the square M4h.

In FIG. 6B, no blocks B exist below the block B (B3), and thus the block movement control unit 22 recognizes that the block B(B3) is away from the block group B0. Thereafter, the block movement control unit 22 moves the block B (B3) downward to the block group B0 as if the block B (B3) were to fall due to gravity. The block movement control unit 22 controls the block B (B3) so as to be moved to the square M3h, for example, for about 0.5 seconds.

Figure 6C:
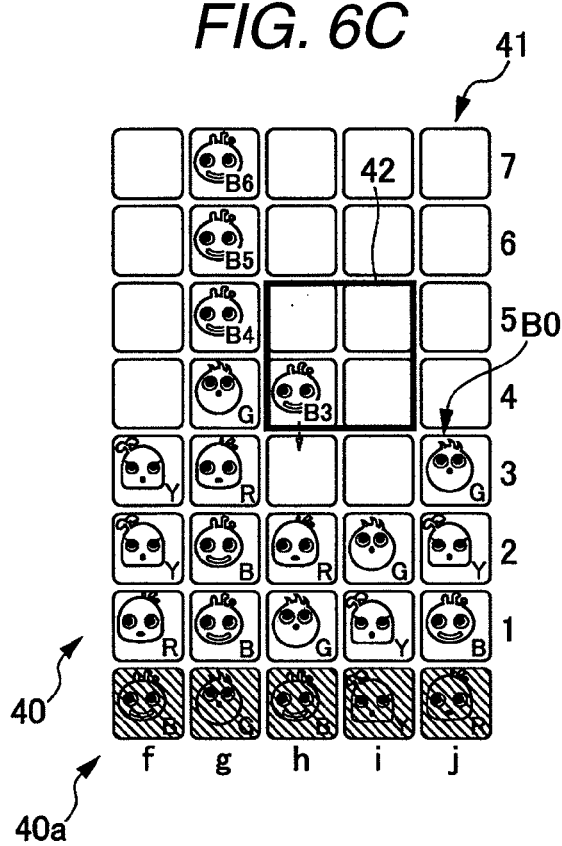

(3) In FIG. 6C, the mouse 2 is operated and the cursor 42 is moved to an area of four squares M4h, M4i, M5h, and M5i such that the block B (B3) is placed on the lower left side of the cursor 42 during a time period until the block B (B3) is moved to the square M3h. Then, if the left button of the mouse 2 is clicked, as shown in FIG. 6D, the block movement control unit 22 moves the selected block B (B3) upward in accordance with the output from the mouse 2 so as to be further away from the block group B0, and then moves the block B (B3) downward again.

Figure 6D:
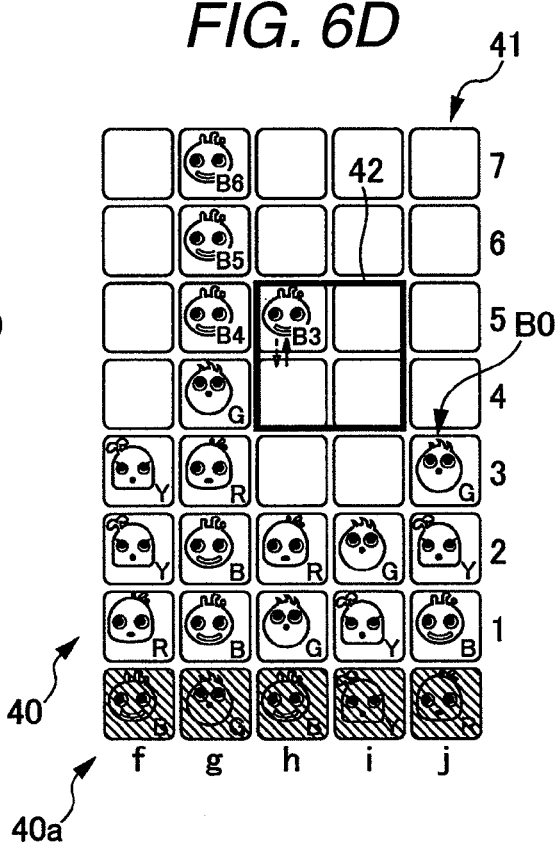
Figure 7:
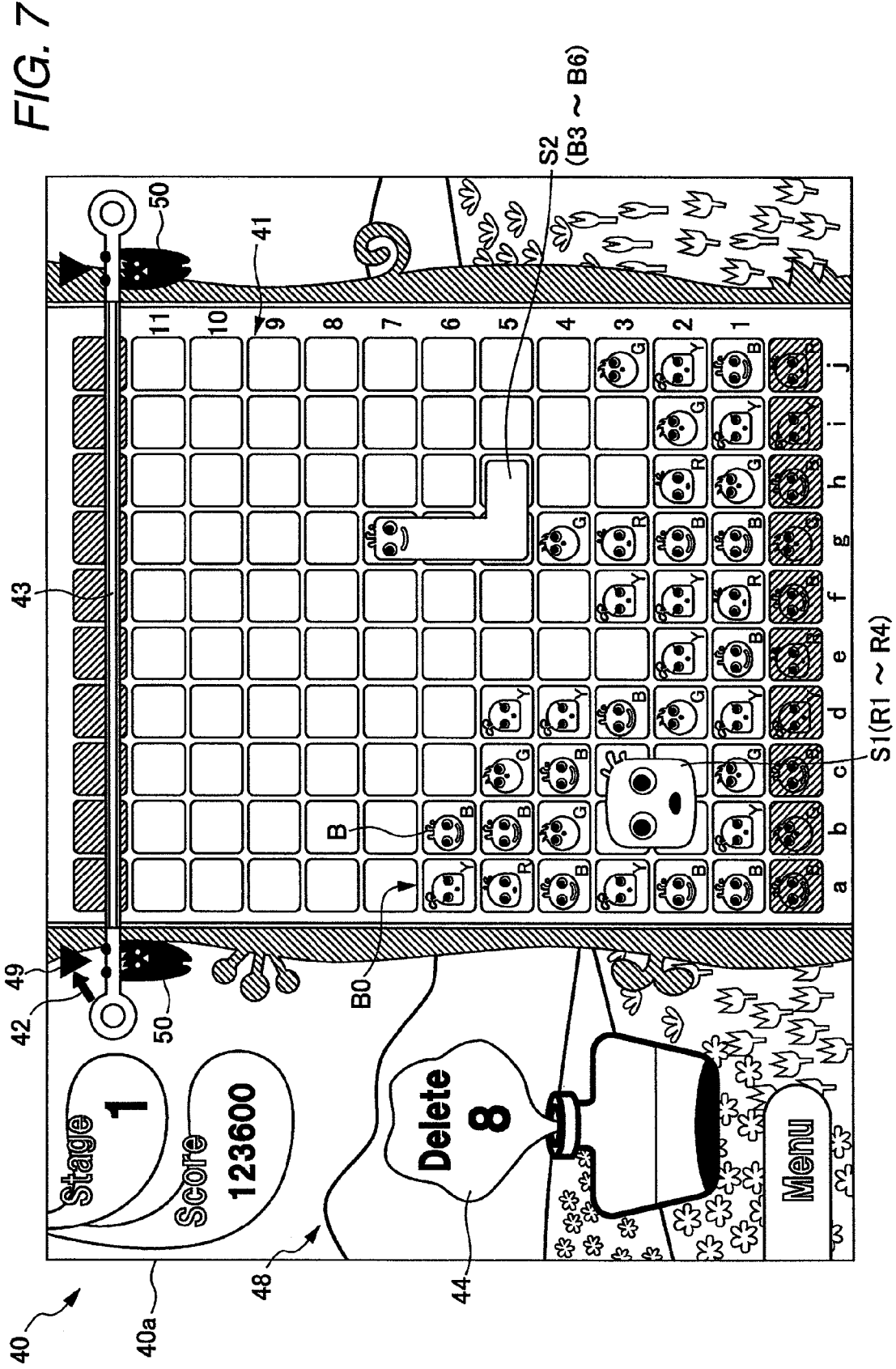
FIG. 7 is a diagram showing a display screen during play according to the first embodiment.

In the setting shown in FIG. 6D, the attribute control unit 24 determines that four blocks B (B3 to B6) are successively placed. When the block B (B3) is not selected again, for example, for about 0.3 seconds, the attribute control unit 24 connects the four blocks B (B3 to B6) satisfying the removal condition to each other. In this case, the attribute control unit 24 connects the block B (B3) being moved and other blocks to each other. As shown in FIG. 7, the attribute control unit 24 sets a new attribute to the connected blocks as a single fixed block S2, and the display control unit 25 displays the fixed block S2 in the playing field 41.

The display control unit 25 updates the numeric value in the number-of-removal-condition-blocks display portion 44 to the numeric value "8", which is obtained by adding the number of blocks B newly satisfying the removal condition, that is, "4".

In this way, the game apparatus 1 is able to provide a new block game program in which a block B is moved to a place away from the block group B0 in accordance with the operation of the mouse 2.

[Block Removal Processing]

Processing to delete the connected blocks B, that is, the fixed block S1 or S2 (block removal processing), is performed as follows.

(1) As shown in FIG. 7, if the player operates the mouse 2 to select a removal bar drop button 49 above the removal bar 43, the block removal control unit 23 starts the block removal processing. In this embodiment, when the cursor 42 selects outside of the playing field 41, the shape of the cursor 42 is changed from a rectangular shape to an arrow.

In order to improve operability, the block removal processing may be started by selecting an area of the background image 48 outside the playing field 41 and clicking the left-button of the mouse 2.

Figure 8:
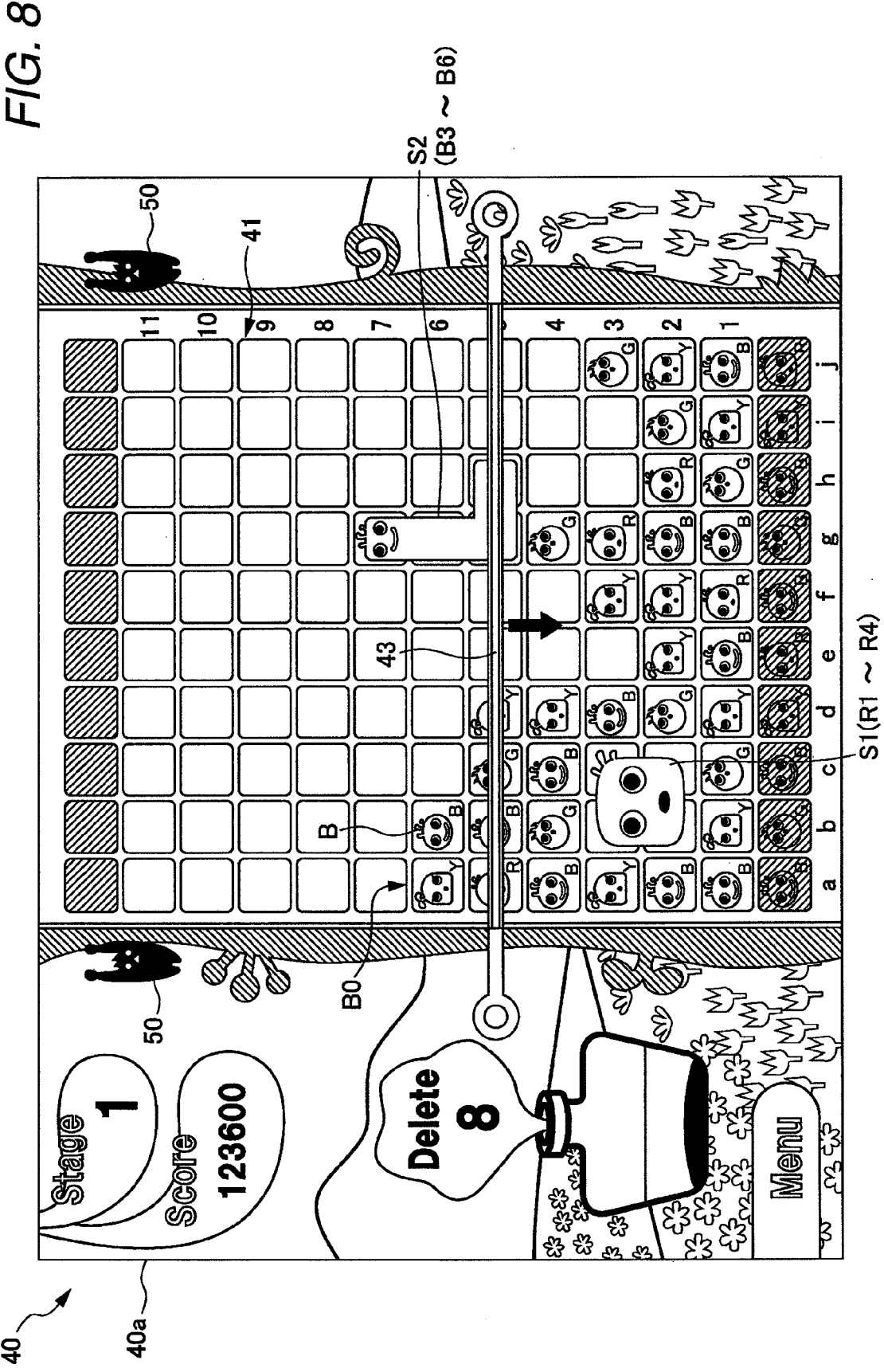
FIG. 8 is a diagram showing a display screen during play according to the first embodiment.

(2) As shown in FIG. 8, the display control unit 25 performs display on the display screen 40a such that, if two bats 50 release their hands from the removal bar 43, the removal bar 43 falls from the upper side of the playing field 41 to the lower side and moves across the playing field 41.

In this way, the game apparatus 1 is able to perform interesting display in a state where timing at which the block B disappears is visible.

Figure 9:
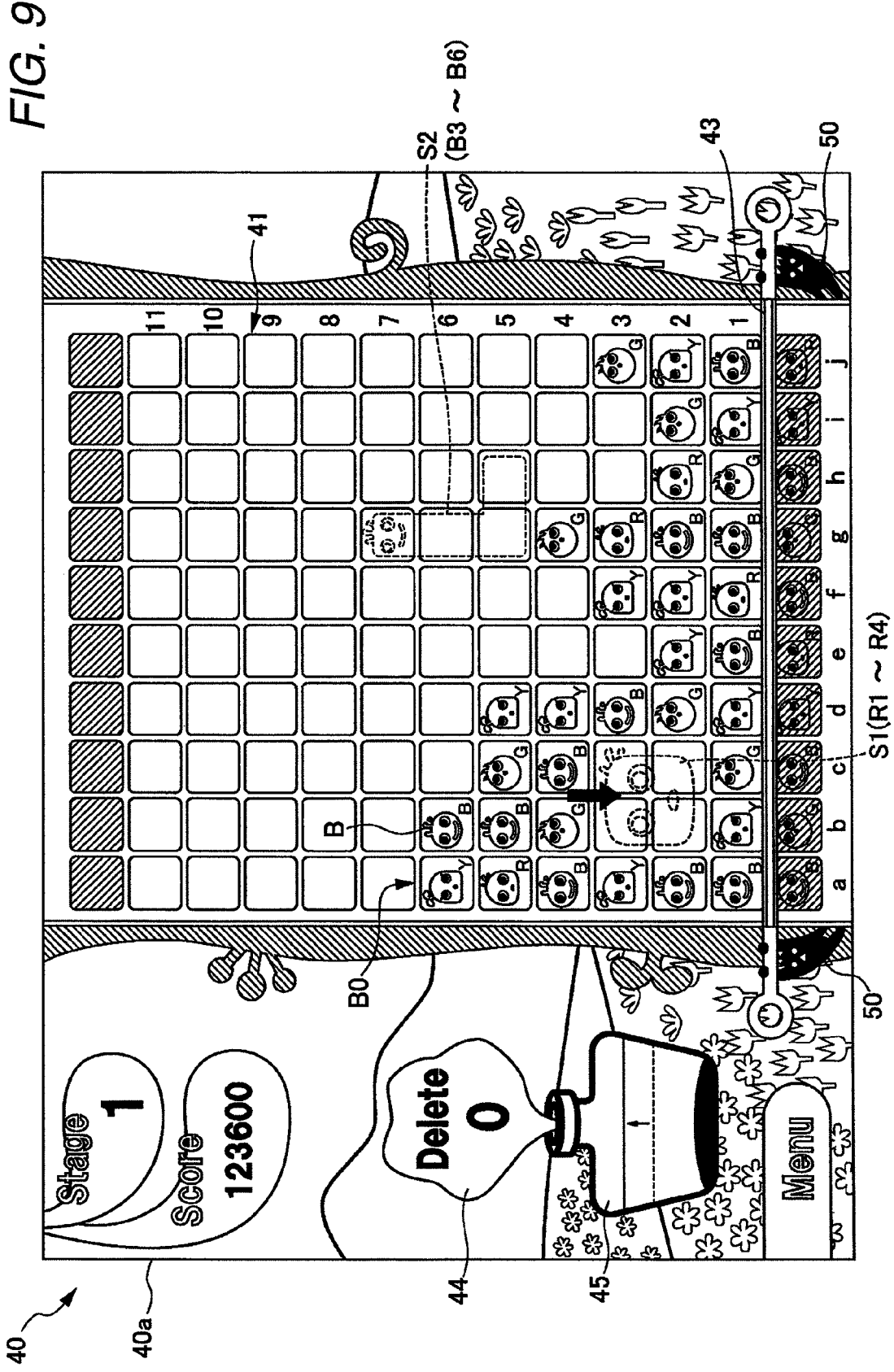
FIG. 9 is a diagram showing a display screen during play according to the first embodiment.

(3) As shown in FIG. 9, if the removal bar 43 reaches the lower side of the playing field 41, the display control unit 25 removes all of the fixed blocks S1 and S2 satisfying the removal condition, that is, 8 blocks B(R1 to R4 and B3 to B6), from the playing field 41 at once.

As described above, if the mouse 2 selects the removal bar drop button 49, the block removal control unit 23 deletes the blocks B satisfying the removal condition at timing based on the operation of the mouse 2. Therefore, the player is able to determine timing at which the blocks B are removed, and further, since deletion can be done at once, can feel exhilaration.

If the blocks B are removed, the display control unit 25 raises the liquid level of the bottle 45 by an amount corresponding to the number of the removed blocks B. If the blocks B are removed, no blocks B satisfying the removal condition exist in the playing field 41. For this reason, the display control unit 25 updates the numeric value in the number-of-removal-condition-blocks display portion 44 and displays the numeric value "0".

Figure 10:
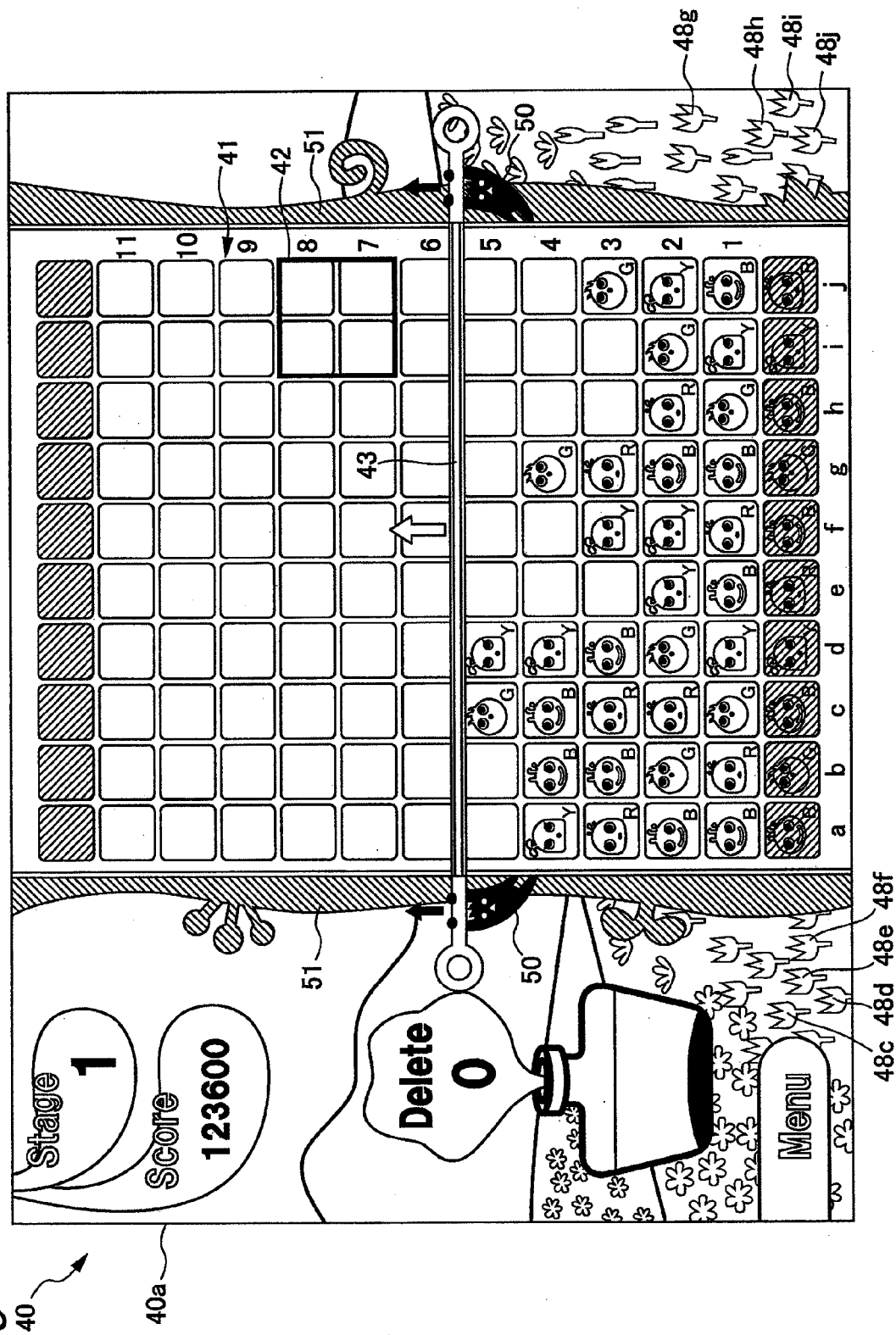
FIG. 10 is a diagram showing a display screen during play according to the first embodiment.

(4) As shown in FIG. 10, if the fixed block S1 (R1 to R4) is deleted, the block movement control unit 22 moves the block B in the square M of the upper row downward by two rows. When the block B is moved downward, and the removal condition is newly established, processing for removing the blocks B newly satisfying the removal condition (so-called chain) is performed.

(5) The display control unit 25 changes the colors of the flowers 48b of the background image 48 on the display screen 40a in accordance with the attributes of the removed blocks B. Here, since the four red blocks B (R1 to R4) and the four blue blocks B (B3 to B6) are removed, four red flowers 48c to 48f and four blue flowers 48g to 48j displayed as blooming.

Thus, the player is able to select the blocks B of preferred colors to satisfy the removal condition so that the display screen 40a is updated to suit his/her taste. The display screen 40a may be changed other than when the blocks B are deleted. For example, if the display screen 40a is changed when the game is ended (game over), the game apparatus 1 can entertain the player when the play is ended.

(6) If the processing to move the block B is completed, the block removal control unit 23 calculates a time period (hereinafter, referred to as a "block removal time") from when the removal is completed until reception of a selection operation of a block B from the mouse 2 is next permitted. That is, even if the removal condition is newly satisfied, the player is not able to delete the blocks B unless the predetermined block removal time has elapsed after the blocks B are deleted. The block removal control unit 23 changes a next block removal time in accordance with the number of the previously removed blocks B. When the number of removed blocks is larger, the block removal control unit 23 sets a shorter block removal time.

In this embodiment, the storage unit 10 stores an operational expression for the block removal time, and the block removal control unit 23 calculates the block removal time based upon the operational expression. For example, when the number of removed blocks B is 1, the block removal time is set to 5 seconds (standard removal time), and each time the number of removed blocks B is incremented by 1, the block removal time is shortened by 0.2 seconds compared with the standard removal time. As described above, when the 8 blocks B are deleted, the block removal time becomes 3.4 seconds (=5−0.2×8).

As shown in FIG. 10, in this game, an operation for selecting the blocks B can be received after the bats 50 climb trees 51 for a time period corresponding to the calculated block removal time, and move the removal bar 43 onto the trees 51. That is, when the block removal time is short, the block removal control unit 23 increases the climbing speed of the bats 50 on the trees 51. When the block removal time is long, the block removal control unit 23 decreases the climbing speed of the bats 50 on the trees 51. In this way, interesting display is performed.

As described above, the game apparatus 1 changes the next block removal time in accordance with the number of removed blocks B. Therefore, the player is prompted to arrange a larger number of blocks B satisfying the removal condition so that a time period until the operation for removal can be received is shortened.

[Block Appearance Processing]

The block appearance control unit 21 produces the blocks B from the lower side of the playing field 41 every 5 seconds (standard appearance time). However, when the blocks B appear immediately after the blocks B are deleted, the block appearance control unit 21 changes a time period until the blocks B next appear (hereinafter, referred to as "block appearance time"), in accordance with the number of removed blocks. When the number of the deleted blocks is larger, the block appearance control unit 21 sets a longer block appearance time. That is, the block appearance control unit 21 performs an inverse operation to the block removal time.

In the present embodiment, the storage unit 10 stores an operational expression for the block appearance time, and the block appearance control unit 21 calculates the block appearance time based upon the operational expression. For example, each time the number of the removed blocks B is incremented by 1, the block appearance time is extended by 0.2 seconds with respect to the standard appearance time. As described above, when the 8 blocks B are removed, the block appearance time becomes 6.6 seconds (=5+0.2×8).

As described above, the game apparatus 1 changes a subsequent block appearance time in accordance with the number of deleted blocks B. Therefore, the player is prompted to arrange a larger number of blocks B satisfying the removal condition so that the block appearance time is extended.

A series of processing during game play will now be described with reference to a flowchart.

Figure 11:
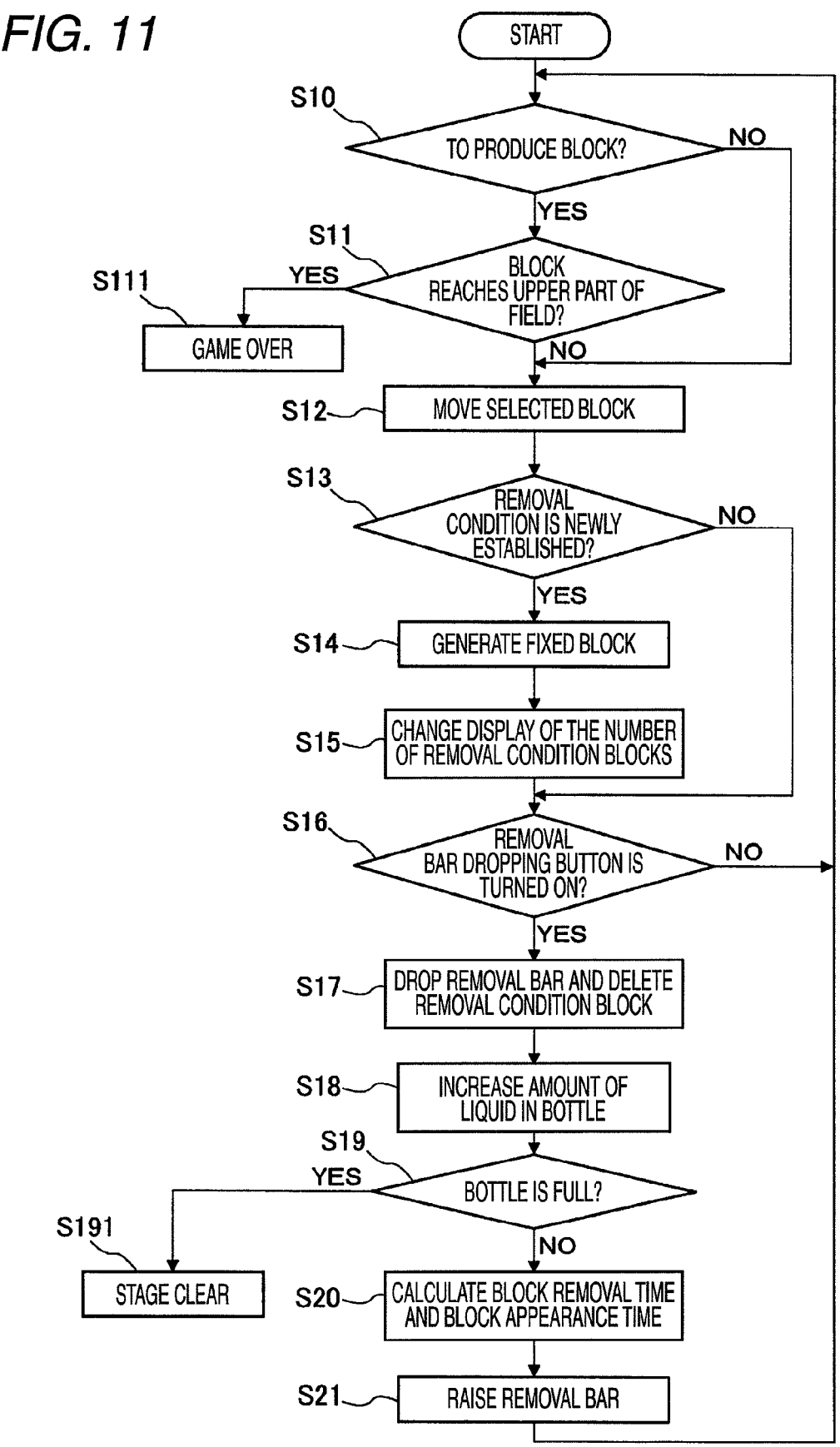
FIG. 11 is a flowchart showing a processing during play according to the first embodiment.

FIG. 11 is a flowchart showing processing during play in the first embodiment.

In Step S10 (hereinafter, Step S is simply referred to as "S"), the block appearance control unit 21 determines whether the block appearance time has elapsed from the previous appearance of the blocks B, and determines whether to produce the blocks B in the playing field 41. If it is determined to produce the blocks B (S10: YES), the block appearance control unit 21 produces the blocks B from the lower side of the playing field 41, and raises the block group B0 by one row. Then, the processing proceeds to S11. Meanwhile, if it is determined not to produce the blocks B (S10: NO), the processing proceeds to S12.

In S11, the control unit 20 determines whether a block B has reached the top portion 41a of the playing field 41. In a case where the control unit 20 has determined that a block B reaches the top portion 41a of the playing field 41 (S11: YES), the processing proceeds to S111, and processing for ending a game (game over) is performed. Meanwhile, when no block B has reached the top portion 41a of the playing field 41 (S11: NO), the processing proceeds to S12 and the play is continued.

In S12, when the block B is selected by the mouse 2, the block movement control unit 22 moves the selected block B (see FIGS. 3 and 6A to 6D).

In S13, the block removal control unit 23 determines whether four or more blocks B of the same attributes are successively arranged in the vertical and horizontal directions and a removal condition is newly established. In a case where it is determined that the removal condition is newly established (S13: YES), the block removal control unit 23 proceeds to S14. Meanwhile, in a case where it is determined that the removal condition is not newly established (S13: NO), the processing proceeds to S16.

In S14, the attribute control unit 24 connects the blocks B newly satisfying the removal condition to each other, and sets a new attribute for the connected blocks as a single fixed block S (see FIGS. 5 and 7).

In S15, the display control unit 25 updates the number of blocks B satisfying the removal condition in the number-of-removal-condition-blocks display portion 44 in the playing field 41 (see FIGS. 5 and 7).

In S16, the block removal control unit 23 determines whether the removal bar drop button 49 has been selected by the mouse 2 and the removal bar drop button 49 is turned on (see FIG. 7). In a case where the removal bar drop button 49 is turned on (S16: YES), the block removal control unit 23 proceeds to S17. Meanwhile, in a case where the removal bar drop button 49 is not turned on (S16: NO), S10 and later are repeatedly performed.

In S17, the display control unit 25 displays the removal bar 43 falling from the upper side of the playing field 41 to the lower side and moving across the playing field 41 (see FIG. 8), and removes the blocks B satisfying the removal condition, that is, the fixed block S, from the playing field 41 (see FIG. 9).

In S18, the display control unit 25 sets the numeric value of the number-of-removal-condition-blocks display portion 44 to "0", and raises the liquid level of the bottle 45 (see FIG. 9).

In S19, the control unit 20 determines whether the bottle 45 is full with the liquid.

In a case where it is determined that the bottle 45 is full with the liquid (S19: YES), the control unit 20 proceeds to S191, and processing for completing a stage is performed. Meanwhile, in a case where the bottle 45 is not full (S19: NO), the processing proceeds to S20.

In S20, the block removal control unit 23 calculates the next block removal time and block appearance time based upon the number of removed blocks B.

In S21, the display control unit 25 causes the bats 50 to climb the trees 51 based upon the calculated block removal time (see FIG. 10) to raise the removal bar 43. Then, processing from S10 is performed repeatedly.

As described above, the game apparatus 1 of the present embodiment is able to remove the blocks B by a new removal method that removes the blocks B satisfying the removal condition in accordance with the operation of the mouse 2.

The game apparatus 1 changes the block removal time and the block appearance time depending on the number of removed blocks B. Therefore, the player is prompted to arrange more blocks B satisfying the removal condition, and as a result, interest in the game can be improved.

The game apparatus 1 connects the blocks B satisfying the removal condition to each other as a fixed block S. Therefore, the established removal condition is not cleared, and the player is requested to play the game in a strategic manner considering an order in which the removal condition is established The game apparatus 1 is able to provide a new game in which the block B can be moved to a place away from the block group B0.

Second Embodiment

A second embodiment of a game apparatus according to the present invention will be described hereinafter.

In the following description and drawings, the same parts as those in the first embodiment are represented by the same reference numerals, and redundant explanations will be omitted.

The game apparatus of the second embodiment changes a movement method for blocks B with respect to the first embodiment.

Figure 12:
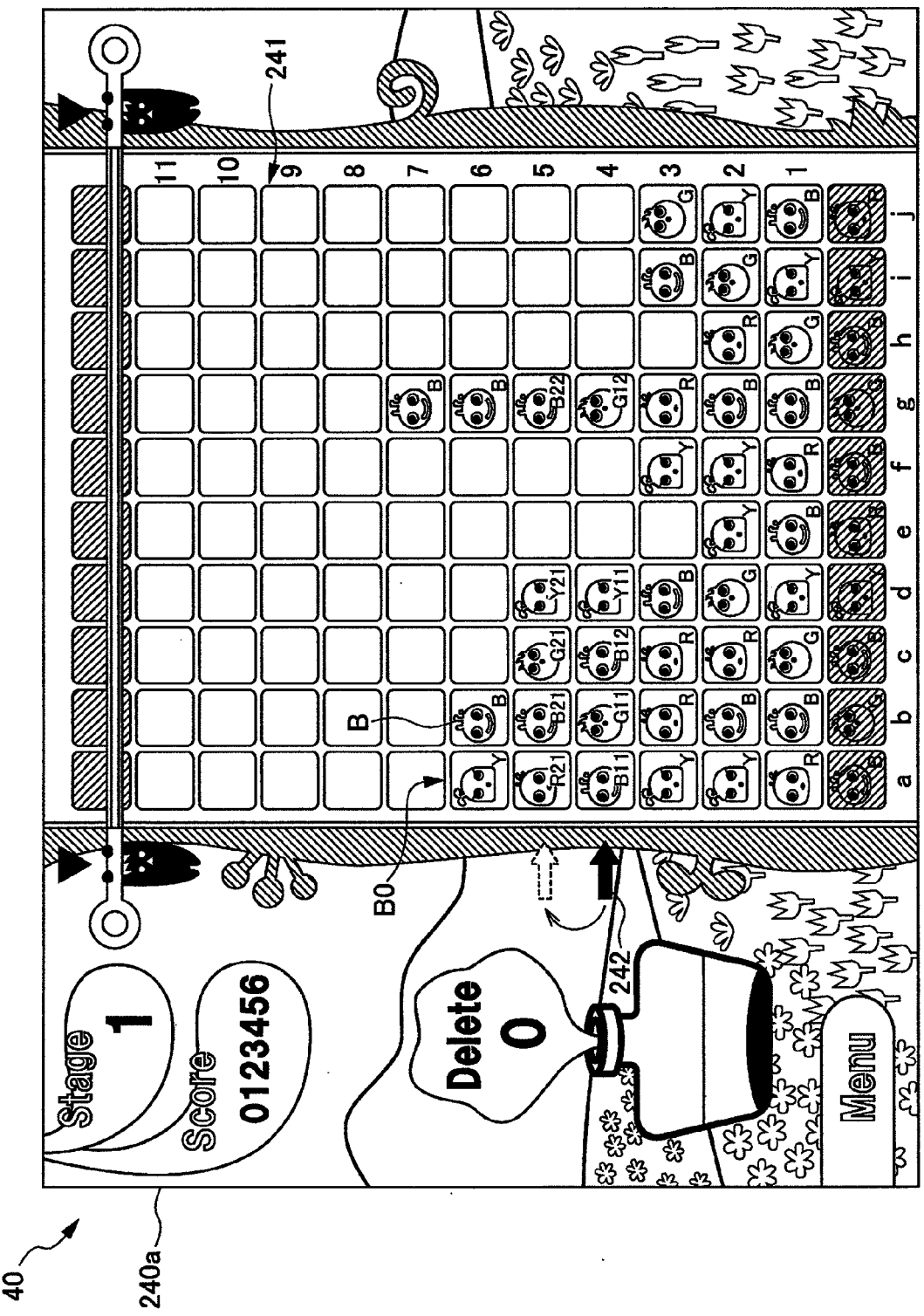
FIG. 12 is a diagram showing a display screen image on a monitor according to a second embodiment of the invention.

FIG. 12 is a diagram showing a display screen 240a of a monitor according to the second embodiment of the invention.

As shown in FIG. 12, on the display screen 240a, a cursor 242 having an arrow shape, and not a rectangular shape, is displayed. The cursor 242 is moved by the operation of the mouse (see FIG. 1). If the left-button of the mouse is clicked, a row or column indicated by the arrow is selected.

In FIG. 12, as indicated by a solid line, the cursor 242 selects the squares M of the fourth row in a playing field 241. Next, as indicated by a dotted line in the drawing, if the squares M of the fifth row are selected, the control unit (see FIG. 1) entirely switches the blocks B of the selected two rows, that is, the blocks B (B11, G11, B12, Y11, and G12) of the fourth row and the blocks B (R21, B21, G21, Y21, and B22) of the fifth row. The same is applied to the column. That is, if two columns are selected, the blocks B of the two columns are entirely switched.

In the case of such a movement method of the blocks B, when a fixed block is generated, the blocks B in the corresponding row and column become unmovable. Therefore, the game apparatus of the second embodiment can provide a game having improved difficulty, as compared with the game apparatus of the first embodiment.

Although the present invention has been described in connection with the embodiments, the present invention is not limited to the embodiments described herein, and there are various modifications and changes possible within the technical scope of the invention, such as the following modifications. Furthermore, the effects described in the embodiments are just illustrative as most preferred effects of the invention, and the effects of the invention are not limited to those described in the embodiments. It should be noted that, although the foregoing embodiments and the following embodiment may be appropriately combined with each other, detailed descriptions thereof are omitted.

MODIFICATION

In the present embodiment, although an example is shown in which the blocks appear from the lower side of the playing field, the game is not limited thereto. For example, the game may be of a so-called dropping type in which the blocks come dropping from the upper side of the playing field.

What is claimed is:

1. A non-transitory computer readable medium including a block game program for a game in which blocks sequentially appear in a playing field that is displayed on a display screen to form a block group, the blocks in the block group being contiguous, the blocks satisfying a removal condition being removable from the block group, wherein the block game program causes a computer to function as:

a receiver that receives a block movement instruction and a block removal instruction, the block movement instruction including a selection of at least one selected block from among the blocks within the block group;

a block movement controller that moves the at least one selected block within the block group in response to the receiver receiving the block movement instruction; and a block removal controller that removes each of the blocks that satisfies the removal condition from the block group in accordance with a timing of when the receiver receives the block removal instruction.

2. The non-transitory computer readable medium according to claim 1, wherein the block game program causes the block removal controller to switch a time period until when a subsequent reception of the block movement instruction by the receiver is permitted in accordance with a number of the blocks removed by the block removal controller.

3. The non-transitory computer readable medium according to claim 1, wherein the block game program further causes the computer to function as a block appearance controller that switches a time period until a subsequent block sequentially appears in the playing field and is added to the block group in accordance with the number of the blocks removed.

4. The non-transitory computer readable medium according to claim 1, wherein the block game program further causes the computer to function as a display controller that displays a bar that moves across the playing field when removing each of the blocks that satisfies the removal condition.

5. The non-transitory computer readable medium according to claim 1, wherein the block game program further causes the computer to function as a display controller that combines a group of the blocks that satisfies the removal condition and displays the group of the blocks on the display screen as a single fixed block.

6. The non-transitory computer readable medium according to claim 1, wherein the block game program further causes the computer to function as a display controller that displays a number of the blocks that satisfy the removal condition on the display screen.

7. The non-transitory computer readable medium according to claim 1, wherein
the block movement controller performs block movement processing to move one of the at least one selected block selected by the block movement instruction toward the block group when the block movement controller moves the one of the at least one selected block to be non-contiguous with the block group.

8. The non-transitory computer readable medium according to claim 7,
wherein the selection of the at least one selected block comprises a selection of a rectangular area in the playing field,
the at least one selected block is included in the rectangular area, and
the block movement controller rotates the at least one selected block within the rectangular area when moving the at least one selected block.

9. The non-transitory computer readable medium according to claim 1, wherein:
the blocks each have an attribute, and
the block game program further causes the computer to function as a display controller that changes the display screen in accordance with the attribute of each of the blocks that is removed.

10. A block game apparatus, comprising:
a storage that includes the non-transitory computer readable medium including the block game program according to claim 1; and
a controller that executes the block game program stored in the storage.

11. The non-transitory computer readable medium according to claim 1, wherein the selection of the at least one selected block includes a selection of an area in the playing field, and
the block movement controller moves the at least one selected block by rotating the at least one selected block within the area.

12. The non-transitory computer readable medium according to claim 1, wherein each of the blocks that satisfies the block removal condition is fixed within the block group.

13. The non-transitory computer readable medium according to claim 1, wherein each of the blocks that satisfies the block removal condition is fixed within the block group after a predetermined period of time.

14. The non-transitory computer readable medium according to claim 1, wherein
the block removal controller removes each of the blocks that satisfies the removal condition during a block removal period, and
the block removal period has a block removal time that is variable.

15. The non-transitory computer readable medium according to claim 14, wherein the block removal time decreases in accordance with a number of the blocks being removed by the block removal controller.

16. A non-transitory computer readable medium including a block game program for a game in which blocks sequentially appear in a playing field that is displayed on a display screen to form a block group, the blocks in the block group being contiguous, the blocks satisfying a removal condition being removable from the block group, wherein the block game program causes a computer to function as:
a receiver that receives a block movement instruction and a block removal instruction, the block movement instruction including a selection of at least one selected block from among the blocks within the block group;
a block movement controller that moves the at least one selected block within the block group in response to the receiver receiving the block movement instruction and the at least one selected block not satisfying the removal condition; and
a block removal controller that removes each of the blocks that satisfies the removal condition from the block group when the receiver receives the block removal instruction,
wherein the block movement controller does not move the at least one selected block within the block group in response to the receiver receiving the block movement instruction when the at least one selected block satisfies the removal condition.

17. The non-transitory computer readable medium according to claim 16, wherein
the block removal controller removes each of the blocks that satisfies the removal condition during a block removal period,
the block removal period has a block removal time that is variable, and
the block removal time decreases in accordance with a number of the blocks being removed by the block removal controller.

18. A non-transitory computer readable medium including a block game program for a game in which blocks sequentially appear in a playing field that is displayed on a display screen to form a block group, the blocks in the block group being contiguous, the blocks satisfying a removal condition being removable from the block group, the block game program causing a computer to function as:
a receiver that receives a block movement instruction and a block removal instruction, the block movement instruction including a selection of at least one selected block from among the blocks within the block group;
a block movement controller that performs block movement processing to move the at least one selected block in a predetermined direction from the block group and to then move the block toward the block group; and
a block removal controller that removes each of the blocks that satisfies the removal condition from the block group when the receiver receives the block removal instruction,
wherein, when the at least one selected block is selected again by the block movement instruction before coming into contact with the block group, the block movement processor performs the block movement processing of the at least one selected block again.

19. The non-transitory computer readable medium according to claim 18, wherein each of the blocks that satisfies the block removal condition is fixed within the block group.

20. The non-transitory computer readable medium according to claim 18, wherein
the block removal controller removes each of the blocks that satisfies the removal condition during a block removal period,
the block removal period has a block removal time that is variable, and
the block removal time decreases in accordance with a number of the blocks being removed by the block removal controller.

* * * * *